US005980089A

United States Patent [19]

Weis

[11] Patent Number: 5,980,089

[45] Date of Patent: Nov. 9, 1999

[54] AUTOMATIC TOKEN DISPENSING APPARATUS AND METHOD

[75] Inventor: Christopher V. Weis, Bedford, Tex.

[73] Assignee: Showbiz Pizza Time, Inc., Irving, Tex.

[21] Appl. No.: 09/048,477

[22] Filed: Mar. 26, 1998

Related U.S. Application Data

[60] Provisional application No. 60/042,435, Mar. 27, 1997.

[51] Int. Cl.[6] .............................. G06F 17/00; G07C 3/00; G07D 1/00

[52] U.S. Cl. .................... 364/479.01; 221/267; 194/200; 194/202; 453/32

[58] Field of Search ............................ 221/267; 194/200, 194/202; 453/32, 57; 364/479.01

[56] References Cited

U.S. PATENT DOCUMENTS

| | | | |
|---|---|---|---|
| 3,686,637 | 8/1972 | Zachar et al. | 340/172.5 |
| 4,225,056 | 9/1980 | Flubacker | 221/2 |
| 4,354,613 | 10/1982 | Desai et al. | 221/4 |
| 4,388,689 | 6/1983 | Hayman et al. | 364/401 |
| 4,512,453 | 4/1985 | Schuller et al. | 364/479 |
| 4,674,041 | 6/1987 | Lemon et al. | 364/401 |
| 4,723,212 | 2/1988 | Mindrum et al. | 364/401 |
| 4,753,625 | 6/1988 | Okada | 453/32 |
| 4,833,308 | 5/1989 | Humble | 235/383 |
| 5,091,713 | 2/1992 | Horne et al. | 364/479 |
| 5,173,851 | 12/1992 | Off et al. | 346/401 |
| 5,218,527 | 6/1993 | Ishikawa et al. | 364/405 |
| 5,305,197 | 4/1994 | Axler et al. | 364/401 |
| 5,366,110 | 11/1994 | Takemoto et al. | 221/2 |
| 5,368,129 | 11/1994 | Von Kohom | 186/52 |
| 5,377,097 | 12/1994 | Fuyama et al. | 364/401 |
| 5,442,568 | 8/1995 | Ostendorf et al. | 364/479 |

*Primary Examiner*—William E. Terrell
*Assistant Examiner*—Joe Dillon, Jr.
*Attorney, Agent, or Firm*—Baker & McKenzie

[57] ABSTRACT

A system and method for dispensing tokens in a Point-Of-Sale ("POS") transaction. The system and method include sensing errors in the token-dispensing operation whereby a POS terminal operator can be notified if a token is jammed in the token dispenser or if the token dispenser is empty.

6 Claims, 3 Drawing Sheets

AUTOMATIC TOKEN DISPENSING APPARATUS AND METHOD

CLAIM OF PRIORITY

The instant patent application claims priority from the United States provisional patent application designated with Ser. No. 60/042,435, entitled "Token Online Digital Dispenser," naming Christopher V. Weis as inventor, and which was filed on Mar. 27, 1997.

FIELD OF THE INVENTION

This invention generally relates to token dispensers and more particularly to systems for automatically dispensing tokens at Point-Of-Sale ("POS") terminals.

BACKGROUND OF THE INVENTION

Video arcades, gaming establishments, public transit authorities, and other organizations have provided token dispensers for dispensing tokens in exchange for money or under other terms. For example, at a video arcade, a customer may insert ten U.S. dollars and receive forty tokens in exchange. The customer then, for example, gives up a token each time he plays one of the video games.

POS terminals are programmable computers that have been programmed specifically to perform retail-specific functions. For some retail chains, these POS terminals are custom-programmed for functions specific to the needs of that chain. The POS terminals are typically placed in the main store area, and the store's employees key in customer orders upon the POS terminal.

SUMMARY OF THE INVENTION

The present invention provides for an automatic token-dispensing system in which a predetermined or calculated number of tokens are provided at the POS terminal to a customer. This transaction may be in conjunction with a sales transaction such as a food order.

The token-dispensing system comprises a mechanical device that accepts tokens in a hopper and dispenses them, a POS terminal, and a controller connected to the mechanical device and the POS terminal. The controller receives commands from the POS terminal, and in turn controls the operations of the mechanical token dispenser. The controller is described in greater detail below, but is generally designed to control the token dispenser and to display the status of the token dispensing operation on a tower display.

Preferably, the POS terminal is in electrical communication with a kitchen terminal or kitchen display device whereby orders received at the POS terminal are transmitted to and filled in the kitchen. Where a kitchen terminal device is used, it is possible for the kitchen to relay status information back to the POS terminal or to another location so that the kitchen performance can be monitored. The POS terminal is preferably connected to, and operable to control, a credit card/check verification unit, a check printer, and a cash drawer.

The advantages of using an automatic token dispensing system include: enhanced security from theft of tokens; shortened token-dispensing time; reliability in token-dispensing accuracy; and flexibility in dispensing tokens, wherein many promotional and package token options can be programmed into the POS terminal without the need to depend on the employee's memory or complicated lists of promotions.

Figure 1:
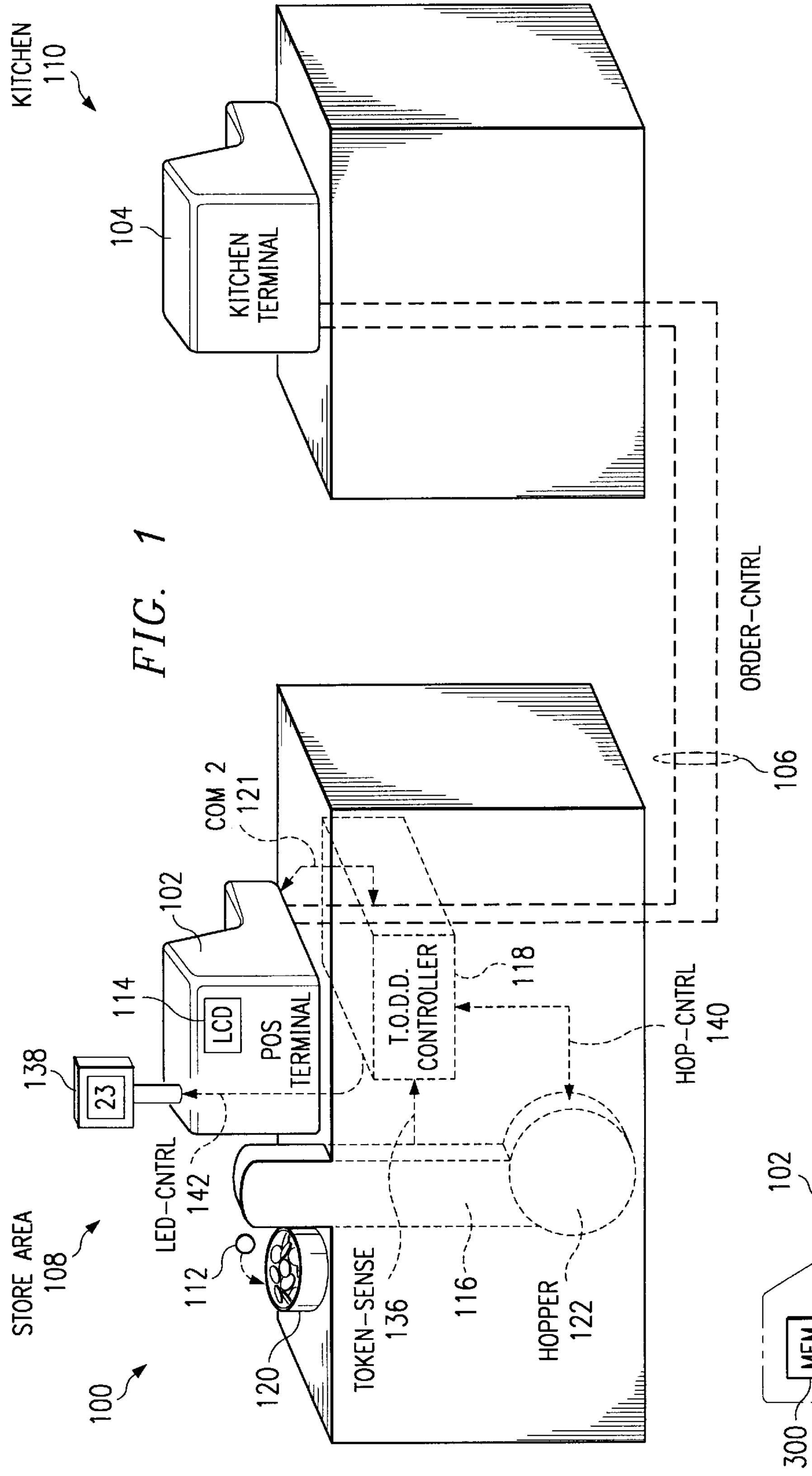
FIG. 1 is a block diagram of an embodiment of the automatic token-dispensing system.

All of these drawings are drawings of certain embodiments of the invention. The scope of the invention is not limited to the specific embodiments illustrated in the drawing and described below. Instead, the scope of the invention is set forth in the claims.

DETAILED DESCRIPTION OF EMBODIMENTS

FIG. 1 illustrates an automatic token dispensing system 100 in accordance with an embodiment of the present invention. Token-dispensing system 100 includes a POS terminal 102 in communication with a kitchen terminal/kitchen display device 104 through an order_cntrl bus 106. The POS terminal 102 is in the store area 108, while the kitchen terminal 104 is in the kitchen 110. Through the order_cntrl bus 106, the POS terminal 102 sends information to the kitchen terminal 104 comprising the orders taken from the customers at the POS terminal 102. The cooks in the kitchen 110 fill the food orders based on the information received at the kitchen terminal 104.

A typical transaction will involve the entry by a restaurant employee of an order into the POS terminal 102, the amount owed will be shown on the Liquid Crystal Display ("LCD display") 114 of the POS terminal 102. Typically, the restaurant customer would pay the restaurant employee in cash, by check, or with a credit card. In a cash transaction, the restaurant employee keys in the amount tendered, and the POS terminal 102 computes the change owed to the customer, displays that amount on the LCD display 114, and opens the cash drawer (not shown). In a check transaction, the amount tendered is typically equal to the amount owed; the check's account number and the check writer's drivers license will be keyed into the POS terminal 102, upon which the POS terminal 102 will initiate a "bad check" inquiry to minimize the store's risk of accepting a bad check. This bad check inquiry is initiated through the credit card/check verification unit (not shown), which dials up to a commercial database that verifies that the checking account from which the check is drawn is active and that the drivers license corresponds to the check writer. In a credit card transaction, the credit card is magnetically swiped or keyed into a credit card/check verification unit (not shown), which may be integral to or separate from the POS terminal 102 and which then dials up to a credit verification service.

Upon acceptance of the customer's tender by cash, credit, or check, the POS terminal 102 will submit the food order, if any, to the kitchen terminal 104. Further, in the preferred embodiment, the POS terminal 102 will dispense a calculated or predetermined number of tokens via a token dispenser 116. In an embodiment, customers receive tokens 112 as part of a package order by the customer, or as a function of the money spent on a food order, or as a separate token order.

The control of the token dispenser 116 is accomplished by the POS terminal 102 through the controller 118, which is interposed between the POS terminal 102 and the token dispenser 116. The communication between the controller 118 and the POS terminal 102 is preferably via a control bus 121, which is preferably the COM2, RS232 communication port of the POS terminal 102, although other communication means between the POS terminal 102 and the controller 118 could be used. For example, although COM1 of the POS terminal 102 is typically reserved for the credit card/check verification units (not shown), this port could be used instead to communicate with the controller. Alternatively, a wireless RF communication link could be established between the POS terminal 102 and the controller 118, or an optical communication link, or an infrared communication link, or an Ethernet or Token-Ring local area network link could be established. Similarly, the various above-listed alternative communication methods could also be used to establish communication between the POS terminal 102 and the kitchen terminal 104.

Figure 4:
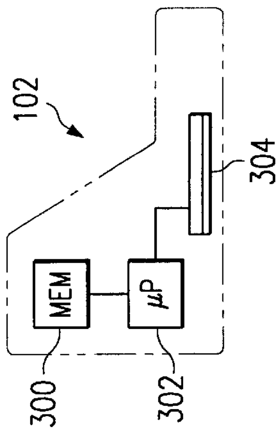
FIG. 4 is a block diagram of one embodiment of the POS terminal.
Figure 2B:
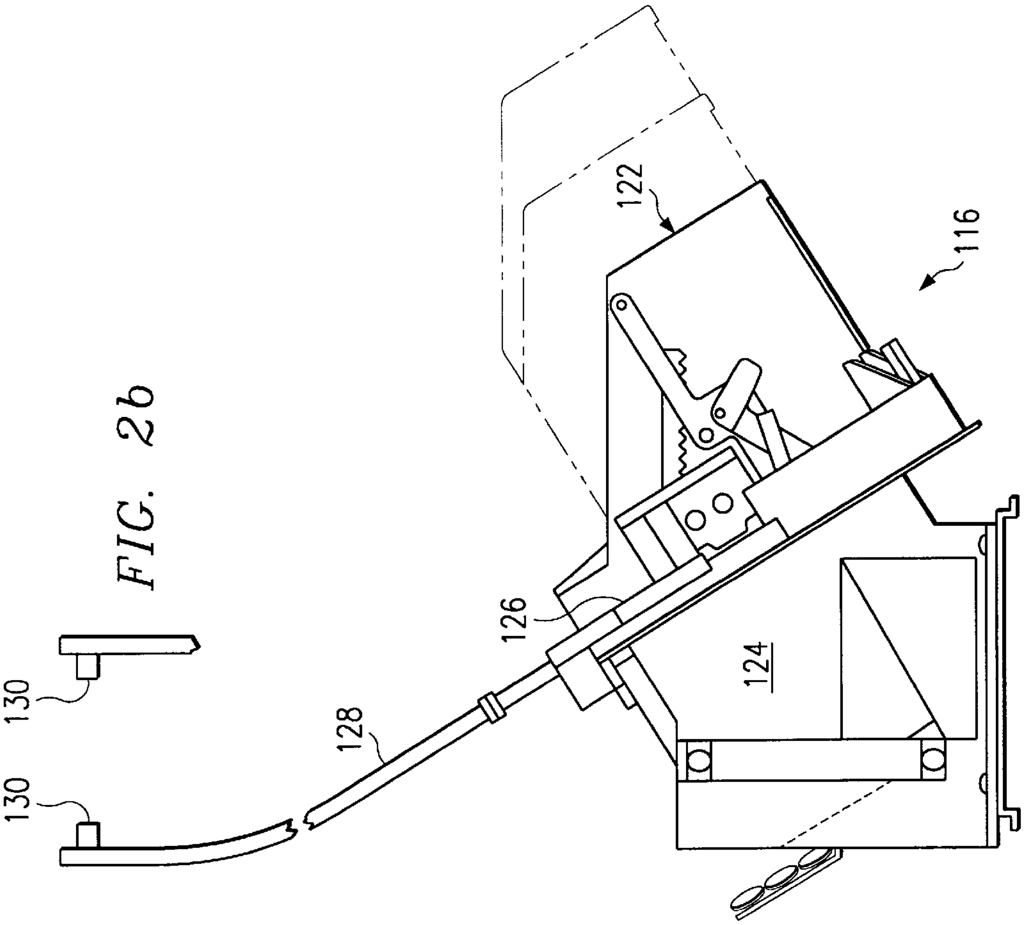
FIGS. 2*a*–2*b* are a front and side view respectively of an embodiment of the token dispenser of FIG. 1.
Figure 2A:
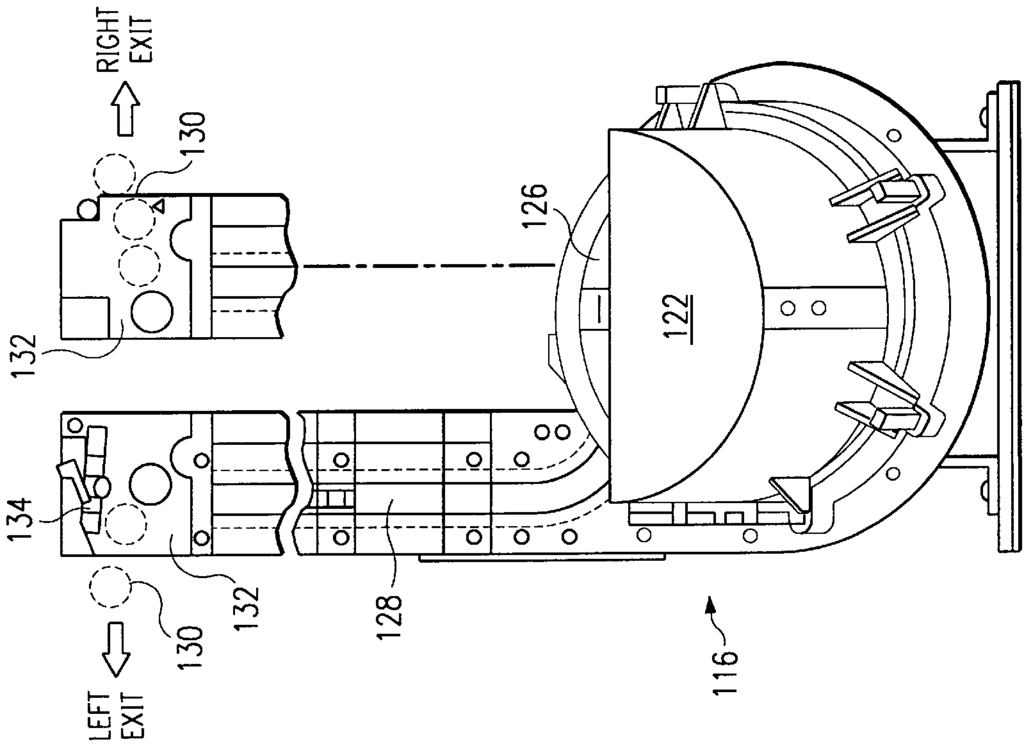

The controller 118 preferably accepts commands from the POS terminal 102 to control the token dispenser 116, which is shown in greater detail in FIGS. 2A–2B. Generally, the POS terminal 102 will comprise a sophisticated software control program whereby the various functions of the token-dispensing system 100 can be implemented and the token-dispensing system 100 status can be verified. FIG. 4 is a block diagram of one embodiment of POS terminal 102. POS terminal 102 includes a microprocessor 300 coupled to a program memory 302 and a controller interface 304. The functions, program flow, and algorithms incorporated into the POS terminal 102 are described in FIG. 3, below.

In a preferred embodiment, the controller 118 will cause the token dispenser 116 to dispense a certain number of tokens 112 into a token bowl 120, from which the customer can reach in and remove the tokens 112. The dispensing of tokens 112, which are stored in a hopper 122, is accomplished when the controller 118 activates a hopper motor 124, which turns the hopper wheel 126, which in turn forces tokens 112 into the token chute 128. Each time a token 112 is forced into the token chute 128, the tokens which were previously in the token chute 128 are displaced upwardly in the chute. Once the token chute 128 has been completely filled up to the token exit 130 by this displacement, the upward pressure from further tokens entering the token chute 128 will force tokens 112 from the top of the chute to eject through the token exit 130.

Each time a token 112 passes in the token chute 128 through a sensing area 132, a token sensor 134 is briefly activated. This token sensor 134 is preferably a mechanical switch, but the inventor has conceived of many other systems to accomplish such token sensing, such as optical pair detection, passive optical detection (i.e., sensing the presence or absence of ambient light), pressure transducers, piezoelectric transducers, magnetic sensors, and conducting pair switches wherein the tokens form an electrical connection between a pair of wires to close a circuit. The passing of the token 112 is communicated from the token sensor 134 to the controller 118 by a token_sense signal 136.

As each token 112 is dispensed, preferably the total number of tokens dispensed to a certain customer or in a certain transaction will be reflected in a tower display 138. The count may be sent directly from the token sensor 134 to the tower display 138, which would then be operable to increment the count and update the display with each toggling of the token_sense signal 136. In the preferred embodiment, the tokens are singularly dispensed, but other coin-dispensing mechanisms are possible and will be encompassed within the scope of the claims. For instance, rather than a proximity sensor 134 determining the passage of an individual token, there could be provided a weight sensor 134 that detects when a certain number of tokens have been assembled in a staging exit area. In practice, such a token dispenser might gather five tokens 112 in an exit-staging area, and a weight sensor 134 could then signal (through the token_sense signal 136, for example) for the five tokens to be ejected simultaneously upon detection by weight of the five tokens 112 in such exit-staging area. The token-dispensing system in this configuration would increment the dispensed token count in such a configuration in increments of five.

Upon satisfactory completion of the token-dispensing operation, or upon initiation of a new token-dispensing operation, the controller 118 would preferably reset the count in the tower display 138 to zero via a tower_reset signal, which would typically be a part of the led_cntrl bus 142 connecting the controller 118 to the tower display 138. Alternatively, the controller 118 can receive the token_sense signal 136 and pass it directly to the tower display 138 through the led_cntrl bus 142, and the tower display 138 would still maintain an internal count that would be incremented by transitions of the token_sense signal 136. As yet another alternative, the controller 118 could maintain its own internal count of the tokens dispensed, and then could directly command, via the led_cntrl bus 142, a display controller (not shown) in the tower display 138 to display the desired information thereon. Also provided in the led_cntrl bus 142 is a led_reset signal whereby the token count maintained in the tower display 138 can be reset at the initiation of a new transaction.

The controller 118 typically operates the token dispenser 116 by sending, as an output of a relay (not shown), an activate_hopper_motor signal (not shown), which is a part of the hop_cntrl bus 140. This activate_hopper_motor signal would remain active until the token sensor 134 had transmitted a pulse to the controller 118 for each of the desired number of tokens to be dispensed. As previously mentioned, if longer than a predetermined period of time passes without a token_sense signal 136 being toggled, while the activate_hopper_motor signal is active, the "time-out" indicates to the controller 118 that the hopper 122 is empty or that there is a jam in the token chute 128. This "time-out" method is one way to determine when the hopper 122 is empty. Another method would be to include a sensor in the hopper 122 to sense directly whether the hopper is empty, for example by a pressure transducer that emits a signal having an amplitude that changes as a function of the weight of the tokens contained within the hopper 122. The signal from this pressure transducer might, for example, be passed to the controller 118 as a part of the hop_cntrl bus 140. In addition to sensing when the hopper 122 is empty, it is possible to sense when the hopper 122 has been filled beyond its capacity. Thus, in an alternative embodiment, an overflow_sense signal might be provided as a part of the hop_cntrl bus 140. The overflow_sense signal might, for example, be generated by another pressure transducer (or the same pressure transducer as is used in one embodiment described for sensing that the hopper 122 is empty or nearly empty) might be used to sense that the hopper 122 is over-filled. This overflow sensing could be performed by sensing the weight of the tokens in the hopper 122. As another method of sensing that the hopper 122 is over-filled, a mechanical switch may be placed at the top of the hopper which may trip when the hopper becomes filled to that predetermined height with tokens 112.

Preferred components, methods and algorithms used by the controller 118 for dispensing the tokens 112 are set forth in the figures and description herein. Generally, the controller 118 monitors the token sensor 134, sensing a brief activation each time a token 112 passes from the token chute 128 through the sensor area 132. This is done in order to count the passage of each token 112 from the token chute 128 out of the token exit 130 and into the token bowl 120. Preferably, the hopper motor 124 will continue forcing tokens out of the 122 hopper into the token chute 128 until the number of tokens requested by the POS terminal 102 have passed from the token chute 128 into the token bowl 120.

In a preferred embodiment of the invention, the controller 118 determines when the hopper 122 is empty by checking for a "time-out." Such a time-out occurs when more than a predetermined duration passes without a token passing through the sensing area 132 and activating the token sensor 134. If there has been ample time for a token 112 to activate the token sensor 134, but yet no token 112 has passed, the most likely conclusion to be drawn is that the hopper 122 has become empty of tokens, such that tokens are no longer being displaced upwardly in the token chute 128. Accordingly, at such time tokens will no longer be ejected through the token exit 130 and dispensed into the token bowl 120. The POS terminal 102 would then typically send an error message to the POS terminal operator (e.g., a restaurant employee), informing that tokens are no longer being dispensed and alerting the POS terminal operator to either fill the hopper 122 or to check for token jams.

Typically, the token sensor 134 will only be activated briefly as the token 112 passes by, but in the event of a jam in the token chute 128, the sensor 134 could become stuck in its active state by the continued presence of a single token. Thus, in another preferred embodiment, certain types of token jams may be separately identifiable by the controller 118 when the token sensor 134 is activated for more than a pre-determined period. As before, this error condition may be directly communicated to the POS terminal operator.

To enhance the security of the token-dispensing system 100, a locked top can be placed over the hopper, as a further deterrent to theft.

Figure 3:
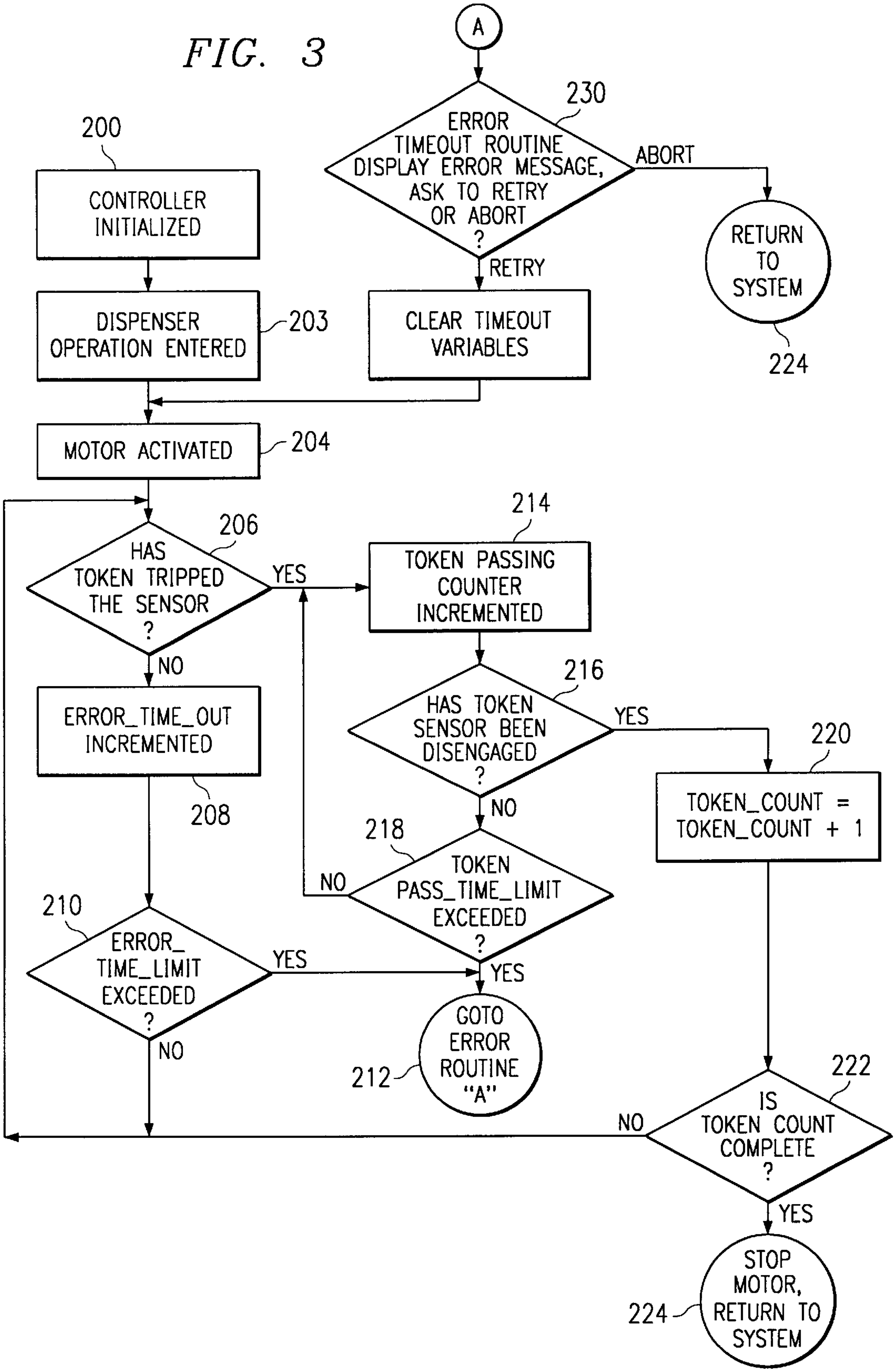
FIG. 3 is flow diagram of the methods carried out by an embodiment of the automatic token-dispensing system.

FIG. 3 illustrates a flow diagram for the operation of the automatic token-dispensing system 100. The operation begins at step 200, where the controller 118 is initialized, preferably under control of the POS terminal 102. At this time, the token count should be zero, as well as the timeout variable, which are used to detect error conditions in the token dispensing operation.

At step 202, the automatic token-dispensing operation begins. Preferably, the token-dispensing operation is initiated by a command from the POS terminal 102. For example, the POS terminal operator may enter a customer's order into the POS, thereby initiating a token-dispensing operation. This token-dispensing operation may be to dispense a certain number of tokens that the customer has directly purchased.

Subsequent to the initiation of the token-dispensing operation at step 202, the hopper motor 124 is activated at step 204. The work of the hopper motor 124 turns the hopper wheel 126, thereby forcing tokens 112 into the token chute 128. Ultimately, the token chute 128 will be filled with tokens 112, and the first tokens forced into the token chute 128 at the bottom and will be forced out of the token chute 128 at the top and through the token exit 130.

At decision step 206, the program checks to see if the token sensor 134 has been engaged. Alternate terms for the sensor 134 being "engaged" might include being "tripped" or "activated." If the token sensor has not yet been engaged, the program flow continues to step 208, where the Error__Time__Out counter within the controller 118, or alternatively within the POS terminal, is incremented. At step 210, this Error__Time__Out is compared against the timeout limit ("Error__Time__Limit Exceeded") at step 210. If the Error__Time__Limit has not yet been exceeded, the program flow returns to step 206, where the program again tests whether the token sensor 134 has been engaged. If the Error__Time__Limit has been exceeded, the program execution flows to the Error Routine at step 212. The program remains in the loop formed by steps 206, 208, and 210 until either the Error__Time__Out counter exceeds the Error__Time__Limit at step 210 or it is detected at step 206 that the token sensor 134 has been engaged.

The sequence in which steps 206, 208, and 210 are executed is a design choice. Other orders of these steps are still encompassed within the scope of the claims. For instance, the Error__Time__Out counter might be incremented at the beginning of the 206/208/210 loop, before checking the token sensor 134.

If it is detected that the token sensor 134 has been engaged, program execution passes to step 214. At step 214, the Token__Passing counter is incremented, and program execution then passes to test step 216. At step 216, the token sensor 134 is tested to see if it has been disengaged by the passing of a token 112 onward. If the token 112 has not yet passed, the program execution continues to step 218, where the Token__Passing counter is compared to the Token__Pass__Time__Limit. If the Token__Passing counter has not exceeded the Token__Pass__Time__Limit at step 218, then program execution returns to step 214, where the Token__Passing counter is again incremented.

Returning again to step 216, if the token sensor 134 has been disengaged, then the token has passed by the sensor and the Token__Count is incremented at step 220. Upon incrementing the Token__Count, the program flow determines at step 222 whether the predetermined or calculated number of tokens have been dispensed within the vending operation. If more tokens are to be dispensed as a part of the vending operation, program execution returns to step 206. If all tokens have been dispensed for the particular vending operation, the program execution stops at step 224—thereby stopping the hopper motor 124 and returning the token-dispensing system 100 to a state of readiness for a new operation. In other words, the POS terminal is returned to a non-token-dispensing state at step 224.

If, on the other hand, the token sensor 134 has not been disengaged, as detected at step 216, the Token__Passing counter is again compared to the Token__Pass__Time__Limit at step 218. If at this time or during a later pass through the 214/216/218 loop, the Token__Passing counter exceeds the Token__Pass__Time__Limit, the program flow continues to the Error Routine at step 212.

Given the periodic nature of the execution of step 216 for detecting whether the token sensor 134 has been disengaged, the frequency of the program's execution of this step 216 is preferably frequent enough to assure that if the sensor 134 is continually engaged, such condition would mean that a single token is continuously located in the token dispensing path. Without such proper program design, the program could incorrectly conclude that a single token was located in the token dispensing path when, in fact, each time the token sensor 134 was checked, there was a new token in the token dispensing path being sensed by the token sensor 134.

The Error Routine is shown at step 230. At this step, the POS terminal operator is notified of the error condition in the automatic token-dispensing system 100. The operator might be notified specifically the nature of the problem, e.g., whether the system had timed-out because of a predetermined period of time passing without the token sensor 134 being engaged or had timed-out because a predetermined time period had passed with the token sensor 134 being continuously engaged. Alternatively, the operator might be informed only that an error had occurred. The error indication might be provided on the tower display 138 or it might be provided in a display 114 of the POS terminal.

In the preferred embodiment at step 230, the POS terminal operator is given the choice of retrying the token-dispensing operation or aborting it. Should the POS terminal operator choose to retry to token-dispensing operation, the program flow goes to step 232 where the timeout variables (Error__Time__Out and Token__Passing) are reset or cleared. From step 232, the program flow continues as before from step 204. If, however, the POS terminal operator elects to abort the token-dispensing operations, program operation returns to the non-token-dispensing portion of the POS terminal code at step 224.

While the presently-preferred embodiments of the present invention that are disclosed above for the purposes of disclosure, alternative embodiments, changes and modifications in the details of construction, interconnection and arrangement of parts will readily suggest themselves to those skilled in the art after having the benefit of this disclosure. This invention is therefore not necessarily limited to the specific examples illustrated and described above. All such alternative embodiments, changes and modifications encompassed within the spirit of the invention are included.

For example, although error messages may be generated to the POS terminal operator through an LCD display 114, error messages might be sent to another employee of the retail establishment such as a manager. Messages might be sent through a different type of display, or might be sent as another type of video notification or as an audio notification. Messages might even be sent from the POS terminal to a remote location. For example, less serious error messages might inform a remote POS terminal service organization that the POS terminal or automatic token-dispensing system is in need of additional tokens or other scheduled or unscheduled maintenance. These remote messages might be automatically-generated e-mails, for instance.

In any case, the scope of the invention is defined by the claims and not by specific embodiments set out in the specification.

What is claimed is:

1. A POS terminal for use in an automatic token-dispensing system having a token dispenser, said token dispenser comprising a token sensor, and a controller, the POS terminal comprising:

a) a controller interface operable to provide communication between said POS terminal and said controller;

b) a program memory for storing program information whereby said POS terminal can supervise the operation of said controller and whereby said controller is operable to supervise the token-dispensing operations of said automatic token-dispensing system; and c) a microprocessor in electrical communication with said controller interface and said program memory whereby said microprocessor is operable to execute said program information stored in said program memory and to supervise the operations of said controller according to said program information;

wherein said microprocessor acts or said program information comprising generating an error condition when either a first predetermined programmable time period has elapsed without the token sensor being engaged or a second predetermined programmable time period has elapsed while the token sensor is continuously engaged.

2. The POS terminal of claim 1 and further comprising a circuit connected to said controller and operable to detect a status of the token sensor.

3. The POS terminal of claim 2 wherein said error condition indicates a failure to sense a token passing from the token dispenser.

4. The POS terminal of claim 3 and further comprising an output for notifying a POS terminal operator of said error condition.

5. The POS terminal of claim 1, wherein said error condition indicates the absence of tokens in the token dispenser.

6. The POS terminal of claim 1, wherein said error condition indicates a token jam in the token dispenser.

* * * * *

UNITED STATES PATENT AND TRADEMARK OFFICE

CERTIFICATE OF CORRECTION

PATENT NO : 5,980,089

DATED : November 9, 1999

INVENTOR(S) : Christopher V. Weis

It is certified that error appears in the above-identified patent and that said Letters Patent is hereby corrected as shown below:

Column 3, Line 21, please replace "microprocessor 300" with --microprocessor 302--;

Column 3, Line 22, replace "program memory 302" with --program memory 300--; and In Claim 1, Column 8, Line 22, replace "or" with --on--.

Signed and Sealed this

First Day of August, 2000

*Attest:*

Q. TODD DICKINSON

*Attesting Officer*

*Director of Patents and Trademarks*